(12) United States Patent
Pancotti et al.

(10) Patent No.: US 8,292,229 B2
(45) Date of Patent: Oct. 23, 2012

(54) AIRCRAFT AND METHOD OF RETRIEVING A RESCUE CRADLE INTO THE AIRCRAFT FUSELAGE

(75) Inventors: Santino Pancotti, Gallarate (IT); Dante Ballerio, Caronno Varesino (IT)

(73) Assignee: Agusta S.p.A., Samarate Frazione Cascina Costa (IT)

( * ) Notice: Subject to any disclaimer, the term of this patent is extended or adjusted under 35 U.S.C. 154(b) by 658 days.

(21) Appl. No.: 12/459,877

(22) Filed: Jul. 9, 2009

(65) Prior Publication Data
US 2010/0096508 A1    Apr. 22, 2010

(30) Foreign Application Priority Data

Jul. 10, 2008    (EP) .................................... 08425475

(51) Int. Cl.
*B64C 1/14*    (2006.01)
(52) U.S. Cl. .................. 244/129.5; 244/7 R; 244/17.11; 244/137.1
(58) Field of Classification Search ............... 244/129.5, 244/118.1, 118.3, 137.1, 137.4; 294/66.1; 441/183, 83
See application file for complete search history.

(56) References Cited

U.S. PATENT DOCUMENTS

| | | | |
|---|---|---|---|
| 2,196,546 A | 4/1940 | Bowers | |
| 2,738,939 A * | 3/1956 | Johnson | 244/137.2 |
| 3,181,823 A | 5/1965 | Gillmore | |
| 3,232,565 A | 2/1966 | Hackenberger, Jr. | |
| 3,561,704 A * | 2/1971 | Schulze | 244/137.1 |
| 3,776,492 A | 12/1973 | Iben | |
| 4,453,684 A | 6/1984 | Hanks | |
| 5,076,515 A | 12/1991 | Goon | |
| 5,190,250 A * | 3/1993 | DeLong et al. | 244/137.1 |
| 5,499,785 A * | 3/1996 | Roberts et al. | 244/137.4 |
| 6,126,114 A * | 10/2000 | Victor | 244/129.5 |
| 2005/0224637 A1 | 10/2005 | Fabian et al. | |
| 2008/0099605 A1* | 5/2008 | Yada et al. | 244/118.3 |

OTHER PUBLICATIONS

Search Report in European Application No. 08425475.4 dated Dec. 18, 2008.

* cited by examiner

*Primary Examiner* — Christopher P Ellis
*Assistant Examiner* — Medhat Badawi
(74) *Attorney, Agent, or Firm* — McCracken & Frank LLC

(57) ABSTRACT

An aircraft capable of hovering, and having a fuselage defining an access opening; driving means for operating a rescue cradle; and a first wall movable between a closed position engaging a first portion of the opening, and a first open position allowing access to the first portion of the opening. The aircraft has a member connected functionally to the first wall and in turn having at least one flat surface; and the member is movable with respect to the wall into a first position, in which the flat surface defines a supporting surface for the cradle when the first wall is in the first open position.

11 Claims, 5 Drawing Sheets

AIRCRAFT AND METHOD OF RETRIEVING A RESCUE CRADLE INTO THE AIRCRAFT FUSELAGE

The present invention relates to an aircraft, in particular a helicopter or convertiplane.

The present invention also relates to a method of retrieving a rescue cradle into the aircraft fuselage.

BACKGROUND OF THE INVENTION

Aircraft are known which are capable of hovering, i.e. remaining in flight at a constant height and zero speed.

Examples of such aircraft are helicopters and convertiplanes.

Aircraft capable of hovering are used to advantage for rescue or salvage purposes in emergency situations and/or in poorly accessible locations, such as rescuing shipwreck survivors.

The actual rescue operation is performed using a winch fitted to a fixed structure of the aircraft, and a rescue cradle suspended from a line operated by the winch.

More specifically, aircraft of the type described comprise a fuselage access opening formed in one side of the fuselage and closed by a hatch in normal flight conditions.

To perform the rescue operation, the hatch is moved into an open position clearing the access opening, and the rescue cradle is lowered and subsequently hoisted back up containing the casualties and/or items for rescue.

At this point, the rescue cradle is retrieved manually, or by means of special equipment, through the opening into the fuselage.

Because of the different attitudes assumed by the aircraft and sudden movements caused by bad weather conditions and the normal difficulties encountered in performing the rescue operation, the operator frequently has difficulty in grasping and retrieving the rescue cradle into the fuselage.

A need is felt within the industry to simplify operator engagement and retrieval of the rescue cradle into the fuselage.

SUMMARY OF THE INVENTION

It is an object of the present invention to provide an aircraft designed to achieve the above in a straightforward, low-cost manner.

According to the present invention, there is provided an aircraft as claimed in the attached Claims.

The present invention also relates to a method of retrieving a rescue cradle into the fuselage of an aircraft, as claimed in the attached Claims.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Number 1 in the accompanying drawings indicates an aircraft capable of hovering, i.e. remaining in flight at a constant height and zero speed.

In the example shown, aircraft 1 is a convertiplane.

Alternatively, aircraft 1 may be a helicopter.

The convertiplane substantially comprises a fuselage 2; and a wing 3 having a central portion fixed to fuselage 2, and two half-wings 4 projecting from fuselage 2.

Figure 4:
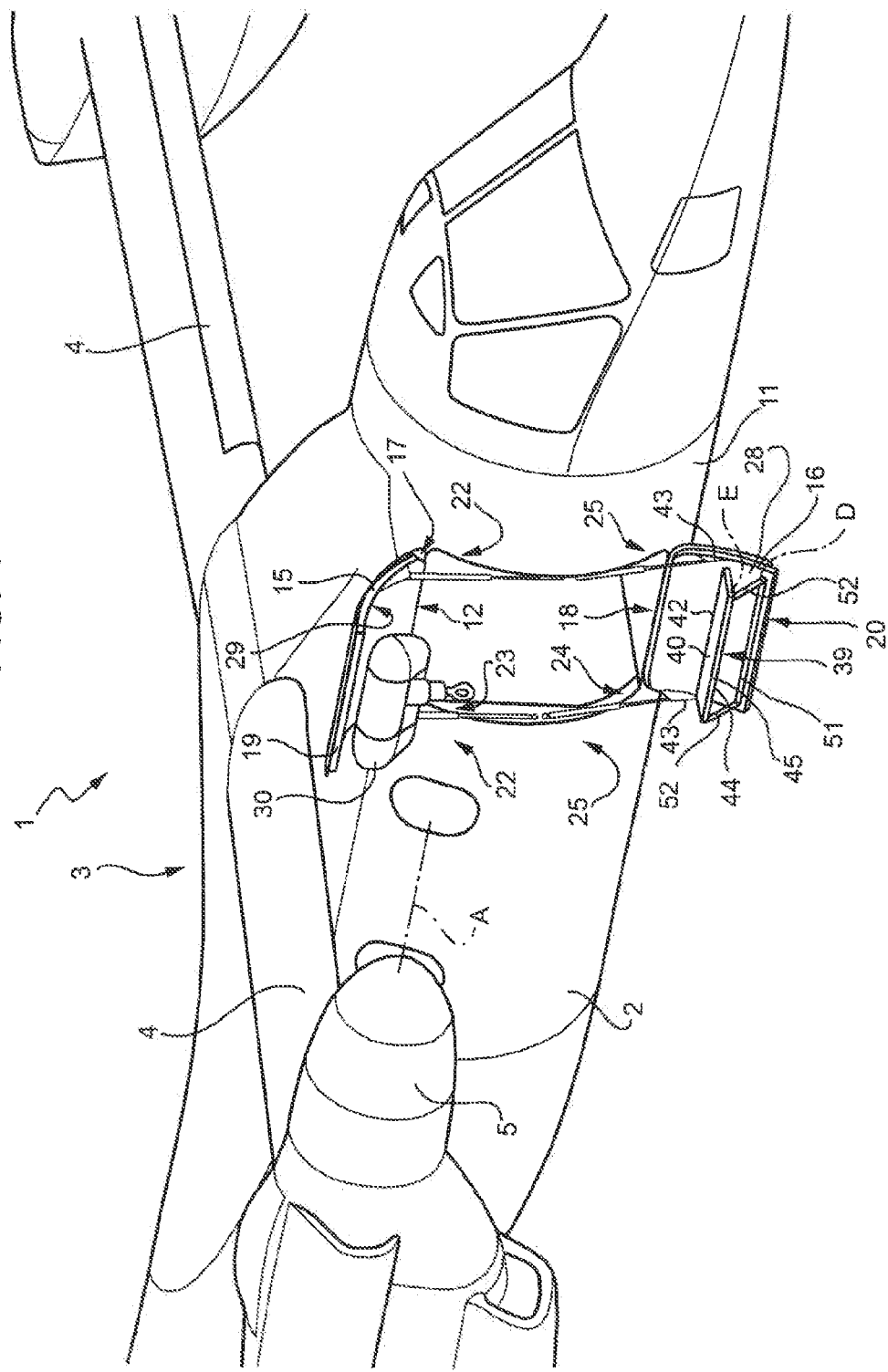

The convertiplane also comprises two engines (not shown) housed in respective nacelles underneath half-wings 4; and two rotors 5 (one shown in FIG. 4) fitted to respective half-wings 4.

Each rotor 5 rotates about a respective axis A, and is connected functionally to a respective engine (not shown).

Figure 1:
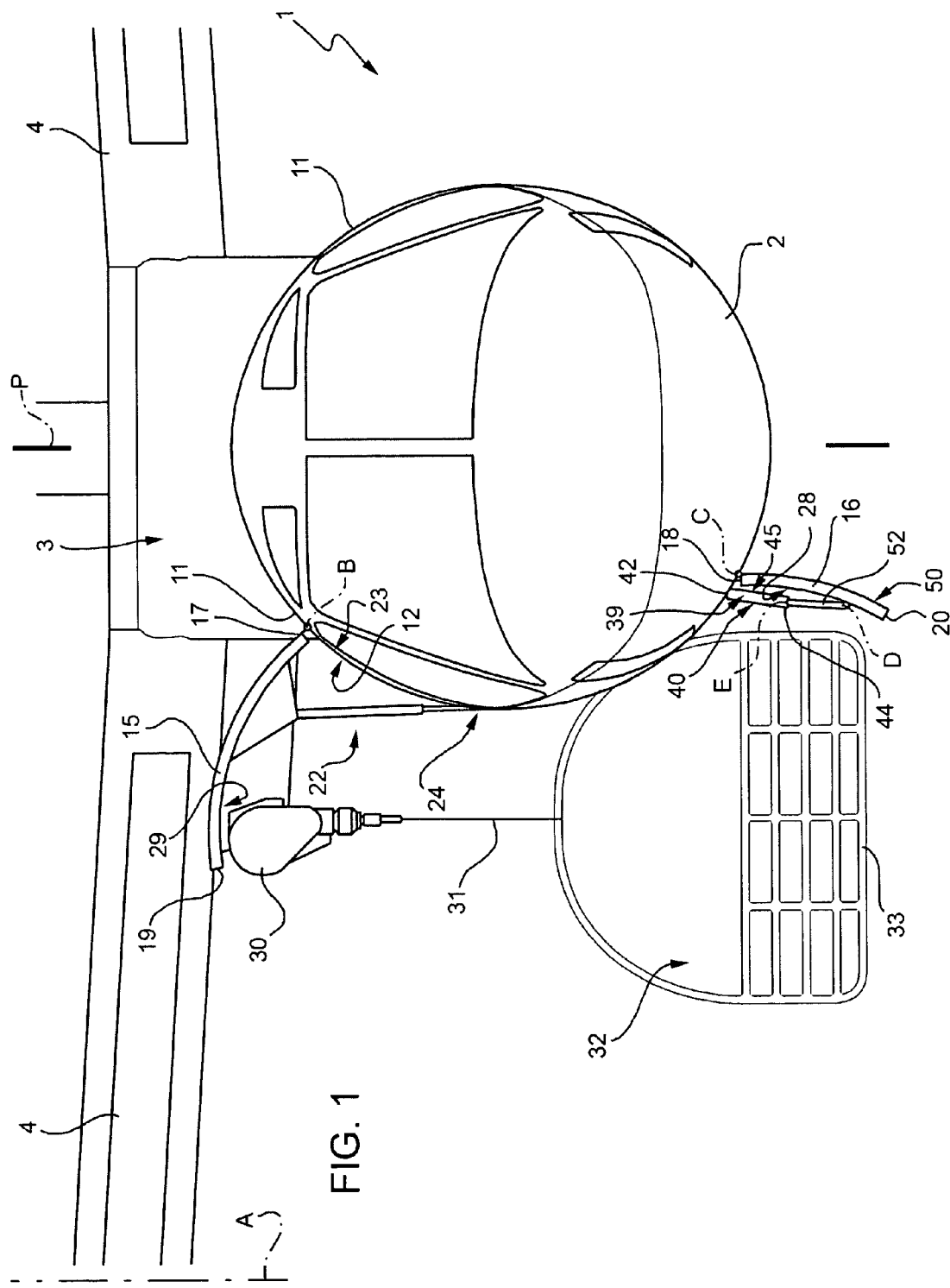
FIG. 1 shows a front view, with parts removed for clarity, of an aircraft, in accordance with the present invention, in the process of hoisting a rescue cradle.
Figure 2:
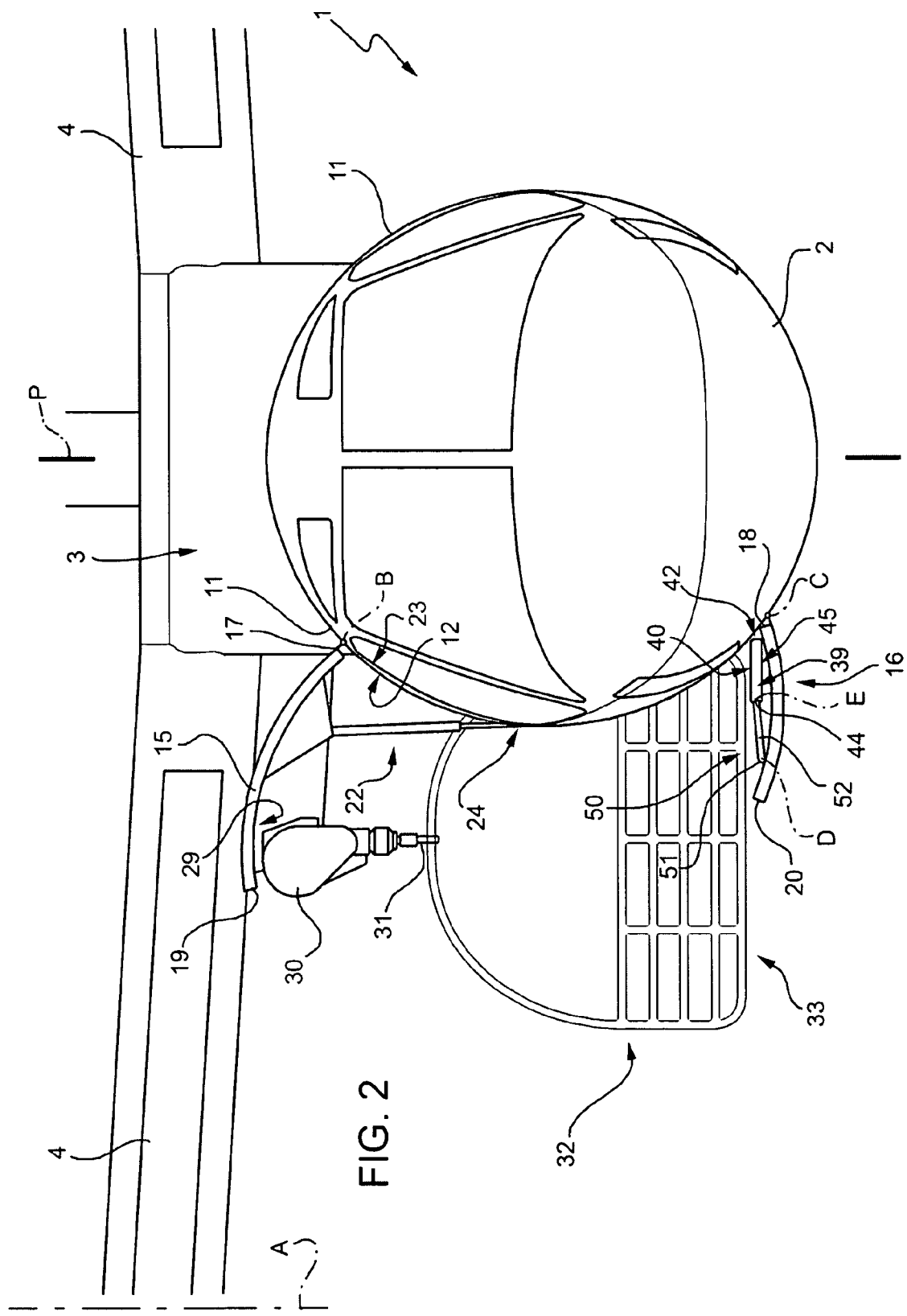
FIG. 2 shows a front view of the FIG. 1 aircraft in the process of retrieving the rescue cradle into the fuselage.
Figure 3:
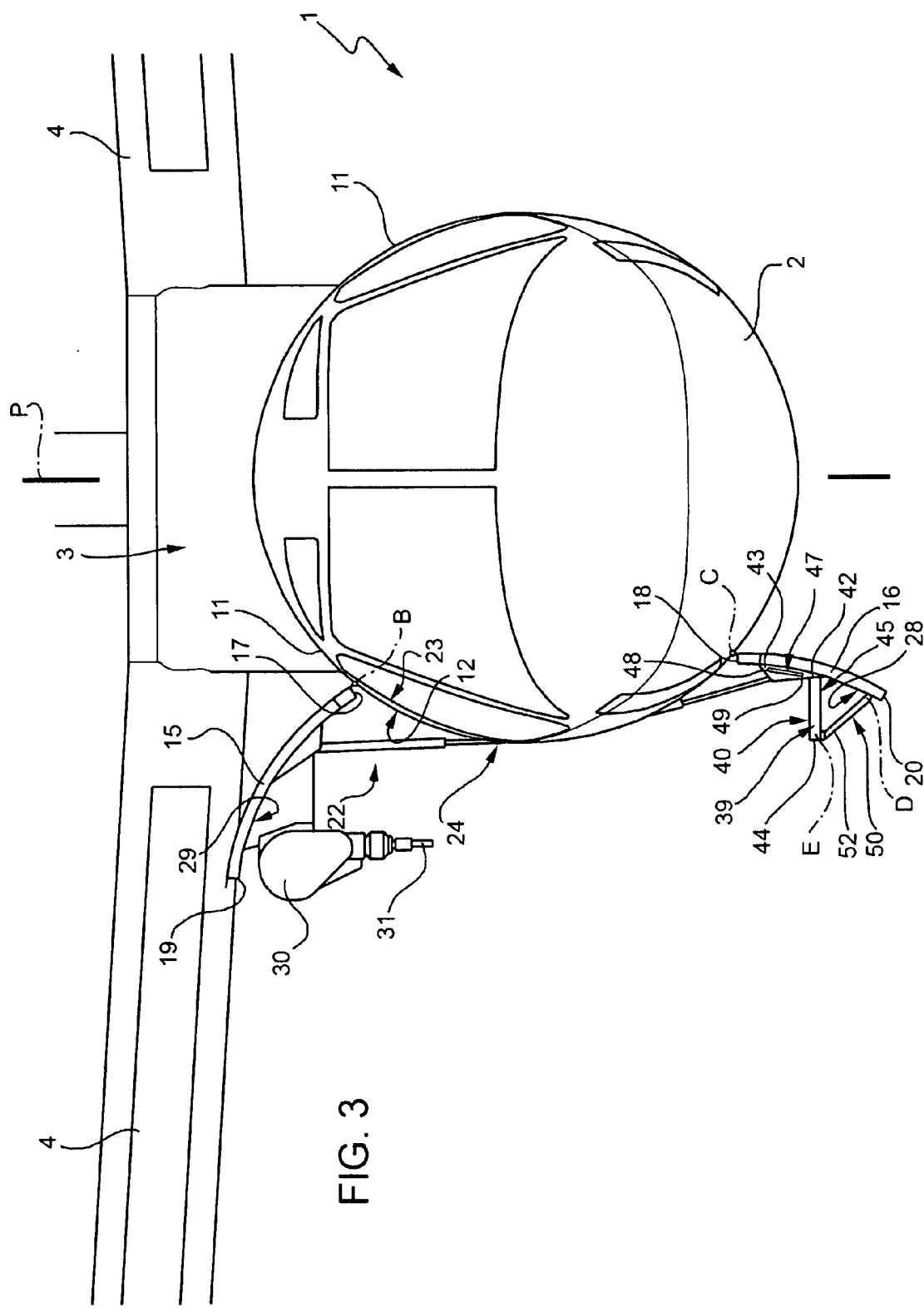
FIGS. 3 and 4 show a front view and a view in perspective, respectively, of the FIGS. 1 and 2 aircraft at a boarding stage.

Each rotor 5 is movable between a first position, in which respective axis A is horizontal (FIGS. 3 and 4), and a second position, in which respective axis A is vertical (FIGS. 1 and 2).

The convertiplane functions substantially in the same way as a fixed-wing aircraft when rotors 5 are in the first position, and functions substantially in the same way as helicopter, and is capable of hovering, when rotors 5 are in the second position.

More specifically, fuselage 2 comprises two sides 11; and a passenger and crew access opening 12 formed in one side 11.

Fuselage 2 also comprises two walls 15, 16 having respective first edges 17, 18 hinged about respective axes B, C parallel to each other and to fuselage 2, and respective second edges 19, 20 opposite edges 17, 18.

Figure 5:
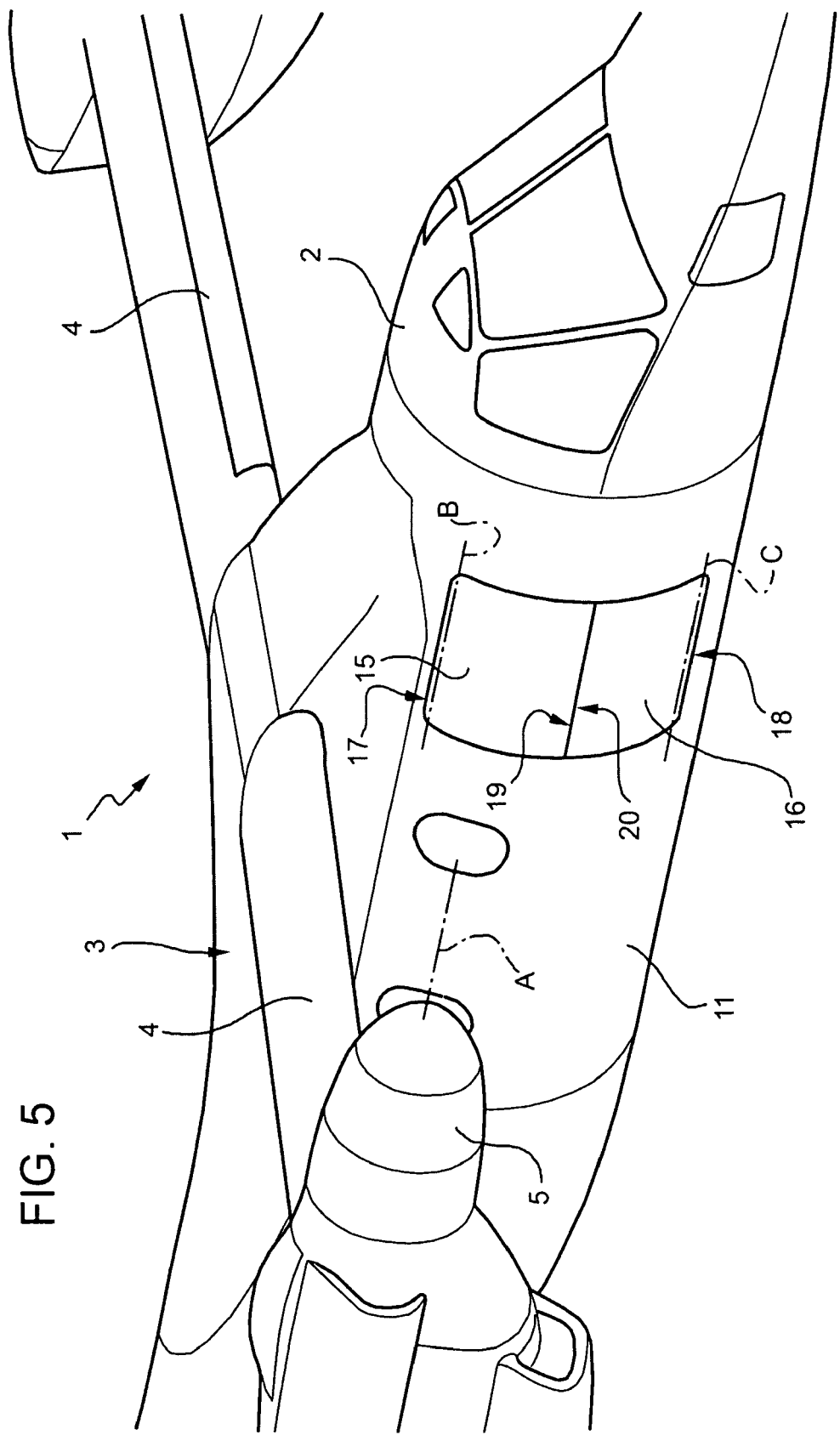
FIG. 5 shows a view in perspective of the FIG. 1-4 aircraft in flight.

In the flight condition shown in FIGS. 1, 2 and 5, wall 15 is located above wall 16, and axes B, C are horizontal.

Wall 15 is curved and concave, and comprises two parallel lateral edges interposed between edges 17, 19.

Wall 16 is also curved and concave, and comprises two parallel lateral edges interposed between edges 18, 20.

Walls 15, 16 can be set to respective closed positions (FIG. 5) engaging respective portions 23, 24 (FIGS. 1-4) of opening 12, and in which edges 19, 20 cooperate with each other.

More specifically, when walls 15, 16 are in the respective closed positions, edges 19, 20 cooperate hermetically, and are capable of withstanding the pressure gradients between the pressurized interior of fuselage 2 and the atmosphere surrounding the convertiplane.

Wall 15 comprises a face 29 which faces inwards of fuselage 2 when wall 15 is in the closed position.

Face 29 is equipped with a winch 30 supporting a line 31 (FIGS. 1 and 2) which runs in a vertical direction and to which a rescue cradle 32 is attachable.

In addition to the closed position, wall 15 also rotates about axis B into an open position (FIGS. 1 and 2) in which edge 19 is located above axis B and winch 30 faces outwards of fuselage 2, with reference to the flight condition shown in FIGS. 1 and 2.

More specifically, wall 15 rotates clockwise about axis B from the closed position to the open position.

Wall 15 is rotated about axis B between the open and closed positions by two actuators 22, each comprising a cylinder fixed to face 29 of wall 15, and a piston fixed to wall 15 and sliding inside the respective cylinder.

Wall 16 rotates about axis C, which in turn runs along two guides (not shown) perpendicular to axis C.

In addition to the closed position, wall 16 can therefore assume a fully-open position (FIGS. 3 and 4), in which edge 20 is located below axis C, and a partly-open position (FIG. 2), in which edge 20 is substantially on a level with axis C.

More specifically, wall 16 rotates anticlockwise about axis C and moves along said guides from the closed position into the partly-open position first, and then into the fully-open position.

Wall 16 is moved between the fully-open, partly-open, and closed positions by means of two actuators 25 (FIG. 4), each comprising a cylinder fixed to fuselage 2, and a piston fixed to wall 16 and sliding inside the respective piston.

Wall 16 comprises a face 28 which faces inwards of fuselage 2 when wall 16 is in the closed position.

More specifically, when wall 16 is in the partly-open position, edge 20 is further away from a central longitudinal plane P, parallel to axes B and C, of fuselage 2 than when wall 16 is in the fully-open position.

The convertiplane advantageously comprises a board 39 connected functionally to wall 16 and comprising a flat surface 40. Board 39 is movable with respect to wall 16 into a first position (FIG. 2) in which, when wall 16 is in the partly-open position, surface 40 defines a supporting surface for a base 33 of rescue cradle 32.

More specifically, board 39 comprises:
an edge 42 parallel to axis C, and the opposite ends of which slide inside respective grooves 47 (FIG. 3) on respective guides 43 fixed to face 28 of wall 16;
an edge 44 opposite edge 42 and parallel to axis C; and
two parallel curved lateral edges extending between edges 42 and 44 and crosswise to axis C.

Edges 42, 44 and the lateral edges define surface 40.

Board 39 also comprises a further surface 45 opposite surface 40.

Each groove 47 comprises a first end 48 closer to axis C; and an end 49 opposite end 48.

Board 39 is movable between a first position (FIG. 2)—in which edge 44 is at a first distance from face 28, and the ends of edge 42 engage respective ends 48 of guide 43—and a second position (FIGS. 3 and 4), in which edge 44 is at a second distance, greater than the first distance, from face 28, and the ends of edge 42 engage respective ends 49 of guide 43.

Wall 16 comprises actuating means 50 for moving board 39 between the first and second position.

More specifically, actuating means 50 comprise a rod 51 (FIG. 4) parallel to axes B and C; and two rods 52, each having a first end hinged to rod 51 about an axis D parallel to axes B and C, and a second end opposite the first end and hinged to a respective end of edge 44 about an axis E parallel to axis D.

In both the first and second position of board 39, the radial size, with respect to axis C, of board 39 and actuating means 50 is contained within the radial size, with respect to axis C, of wall 16.

In other words, whatever position board 39 is in, board 39 and actuating means 50 are closer than edge 20 to axis C.

More specifically, when board 39 is in the second position, surface 40 is perpendicular to axis C.

When board 39 is in the first position, surface 40 is parallel to axis C (FIG. 2), and rod 51 is located on the opposite side of edge 44 to edge 42.

Rods 52 are parallel and spaced apart.

When wall 16 is in the fully-open position and board 39 in the second position (FIGS. 3 and 4), surface 40 defines a substantially horizontal tread by which to enter and exit from fuselage 2 through opening 12.

Operation of the convertiplane will now be described as of the situation (FIGS. 3 and 4) in which wall 15 is in the open position, wall 16 is in the fully-open position, and board 39 is in the second position.

In this situation, surface 40 defines the tread enabling crew access to fuselage 2 through opening 12.

Once the crew has boarded, actuating means 50 move board 39 into the first position, and actuators 22, 25 move respective walls 15, 16 into the closed position.

If a rescue and/or salvage operation becomes necessary in flight, rotors 5 are turned so that respective axes A are vertical (FIGS. 1 and 2), and the convertiplane functions in helicopter mode and is maintained hovering, i.e. at constant height and zero speed.

At this point, actuators 22 move wall 15 into the open position, actuators 25 moves wall 16 into the fully-open position, and board 39 remains in the first position.

Cradle 32 is attached to winch 30 and lowered to perform the rescue and/or salvage operation.

Wall 16 being in the fully-open position, and board 39 in the first position, edges 20, 44 do not interfere with the lowering of cradle 32.

Once the casualties and/or items for rescue are loaded into cradle 32, winch 30 is operated to raise cradle 32 into a position above axis C.

As cradle 32 is raised, wall 16 is in the fully-open position, and board 39 in the first position, so edges 20, 44 do not interfere with cradle 32 (FIG. 1).

At this point, actuators 25 move wall 16 into the partly-open position.

Actuating means 50 keep board 39 in the first position, in which surface 40 is substantially horizontal and perpendicular to line 31.

The operator rests part of base 33 of cradle 32 on surface 40, retrieves cradle 32 into fuselage 2, and releases it from line 31.

Actuators 22, 25 then move walls 15, 16 into the closed position (FIG. 5).

The advantages of aircraft 1 and the method according to the present invention will be clear from the above description.

In particular, when wall 16 is in the partly-open position, and board 39 in the first position, surface 40 defines a supporting surface for at least part of base 33 of cradle 32.

As such, retrieval of the cradle by the operator is made much easier.

Moreover, wall 16 is in the fully-open position, and board 39 in the first position, as cradle 32 is raised and lowered.

Edge 44 being at a minimum distance from face 28, and edge 20 at a minimum distance from plane P when raising or lowering the cradle, edges 20, 44 do not interfere with cradle 32 as it is raised or lowered.

Finally, when walls 15, 16 are in their respective closed positions, board 39 is in the first position, so edge 44 and actuating means 50 do not interfere with winch 30 fitted to wall 15, and pose no serious problems inside fuselage 2.

Clearly, changes may be made to aircraft 1 and the method as described herein without, however, departing from the scope of the present invention.

The invention claimed is:
1. An aircraft capable of hovering, and comprising;
a fuselage defining an access opening;
driving means for moving a rescue cradle; and
a first wall movable between a closed position engaging a first portion of said opening, and a first partly open position allowing access to said first portion of said opening;
the aircraft comprising a member connected to said first wall and in turn comprising at least one flat surface, said member being movable with respect to said first wall into a first position in which said flat surface defines a supporting surface for said cradle when said first wall is in said first partly open position;

said flat surface being substantially horizontal when said member is in said first position and said first wall is in said first partly open position;

said first wall being connected to said fuselage, at least in rotary manner about a first axis, and rotating about said first axis to move between said closed position and said first partly open position;

said first wall rotating about said first axis in a given rotation direction to move from said closed position to said first partly open position, and rotating about said first axis in the same rotation direction to move from said first partly open position to a second fully open position;

said member comprises a first end edge connected functionally to said first wall, and a second end edge opposite said first end edge;

said first wall comprising a third edge connected functionally to said fuselage at least in rotary manner about said first axis, and a fourth edge opposite said third edge;

said second end edge and said fourth edge do not interfere with the lowering of said cradle when said member is in said first position and said first wall is in said second fully open position;

said flat surface being substantially horizontal and defining a tread when said member is in a second position and said first wall is in said second fully open position.

2. The aircraft of claim 1, wherein the said second end edge is located at a first distance from said first wall when said member is in said first position, and at a second distance from said first wall when said member is in said second position distinct from said first position, said first distance being smaller than said second distance.

3. The aircraft of claim 2, wherein said first end edge of said member slides inside a groove defined by a guide on said first wall.

4. The aircraft of claim 2, further comprising actuating means for moving said member, with respect to said first wall, between said first and second position.

5. The aircraft of claim 4, wherein said actuating means comprises a first rod fixed to said first wall, and at least one second rod hinged to said first rod and to said second edge of said member; said first edge and said first rod being located on opposite sides of said second edge when said member is in said first position.

6. The aircraft of claim 4, wherein at least when said member is in said first position, said member and said actuating means are located at a distance from said first axis smaller than the distance between said fourth edge and said first axis.

7. The aircraft of claim 6, wherein said fourth edge is located at a first distance from a longitudinal plane, parallel to said first axis, of the fuselage when said first wall is in said first partly open position, and is located at a second distance from said longitudinal plane, smaller than said first distance, when said first wall is in said second fully open position.

8. The aircraft of claim 1, further comprising a second wall supporting said driving means; said second wall being movable between a further closed position engaging a second, portion, distinct from said first portion, of said opening, and a further open position allowing access to said second portion and in which said driving means are located outside said fuselage.

9. The aircraft of claim 1, wherein the aircraft is a convertiplane.

10. The aircraft of claim 1, wherein the aircraft is a helicopter.

11. A method of retrieving a rescue cradle into a fuselage of an aircraft capable of hovering, said fuselage comprising an access opening, and a wall which rotates about an axis and in turn comprises a first edge connected to said fuselage, and a second edge opposite said first edge, said method comprising the steps of:

raising said cradle outside said fuselage;

moving said wall into a first partly open position allowing access to at least a portion (24) of said opening when said raising step is terminated;

resting said cradle on a supporting surface defined by a flat substantially horizontal surface, said flat surface being defined by a member fitted to said wall and set to a first position with respect to the wall;

moving said wall into a second fully open position prior to said raising step; said second edge being located at a first distance from a longitudinal plane of said fuselage when said wall is in said first partly open position, and being located at a second distance, smaller than said first distance, when said wall is in said second fully open position; said plane being parallel to said axis;

moving said member into said first position with respect to said wall when said wall is in said second fully open position;

rotating said first wall about said first axis in a given rotation direction to move from said closed position to said first partly open position; and rotating said first wall about said first axis in the same rotation direction to move from said first partly open position to a second fully open position;

wherein said member comprises a first end edge connected functionally to said first wall and a second end edge opposite said first end edge, said first wall comprises a third edge connected functionally to said fuselage at least in rotary manner about said first axis and a fourth edge opposite said third edge, said second end edge and said fourth edge do not interfere with the lowering of said cradle when said member is in said first position and said first wall is in said second fully open position, and wherein said fiat surface is substantially horizontal and defines a tread when said member is in a second position and said first wall is in said second fully open position.

* * * * *